United States Patent [19]

Anderson

[11] Patent Number: 4,875,795
[45] Date of Patent: Oct. 24, 1989

[54] STRUCTURAL CONNECTOR UTILIZING TABBED SUPPORT SUBSTRUCTURE

[75] Inventor: Robert E. Anderson, Huntington Station, N.Y.

[73] Assignee: Grumman Aerospace Corporation, Bethpage, N.Y.

[21] Appl. No.: 131,700

[22] Filed: Dec. 11, 1987

[51] Int. Cl.⁴ .............................................. F16B 1/00
[52] U.S. Cl. ................................... 403/279; 403/274; 403/282; 244/123; 29/513
[58] Field of Search ............... 403/254, 252, 242, 279, 403/274, 282; 29/513; 244/123, 132

[56] References Cited

U.S. PATENT DOCUMENTS

| | | | |
|---|---|---|---|
| 254,842 | 3/1882 | Pflug | 403/282 |
| 3,096,958 | 7/1963 | Koontz . | |
| 3,695,649 | 10/1972 | Lavergne . | |
| 3,995,080 | 11/1976 | Cogburn et al. . | |
| 3,995,081 | 11/1976 | Fant et al. . | |
| 4,113,910 | 9/1978 | Loyd . | |
| 4,208,148 | 6/1980 | Biszantz . | |
| 4,210,694 | 7/1980 | Fogg, III . | |
| 4,214,793 | 7/1980 | Gargrave . | |
| 4,261,118 | 4/1981 | Boemer . | |

*Primary Examiner*—Randolph A. Reese
*Assistant Examiner*—Carol I. Bordas
*Attorney, Agent, or Firm*—Pollock, VandeSande & Priddy

[57] ABSTRACT

In the past wing skin structures have been connected to support substructures by means of rivets or other mechanical fasteners which create stress points and leakage points when aircraft wings are filled with fuel. The present invention utilizes a support substructure having tabs which interleave between plies of a wing skin to mechanically interlock the wing skin and support substructure. The wing structure and support substructure may be fabricated from aircraft composite materials.

10 Claims, 3 Drawing Sheets

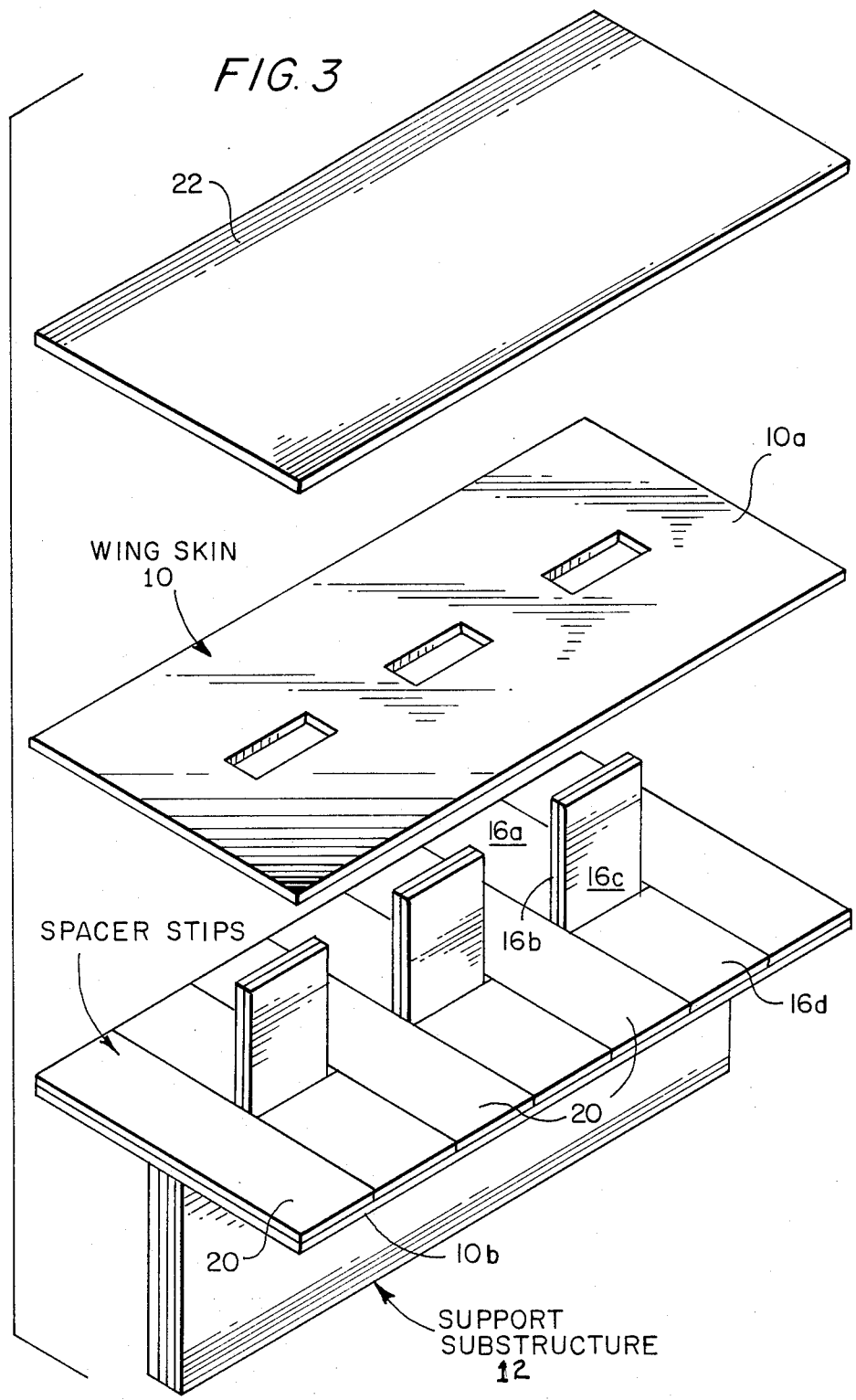

STRUCTURAL CONNECTOR UTILIZING TABBED SUPPORT SUBSTRUCTURE

FIELD OF THE INVENTION

The present invention relates to a fastenerless joint, and more particularly to such a joint for composite aircraft structures.

BACKGROUND OF THE INVENTION

In many fabrication applications laminated structures are attached to support structures by common fastening techniques. In one particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes mechanically interleaved plies of a composite laminate wing structure which enforces the normal bonding between plies of the laminate.

A ply having flexible tabs is interwoven between an aircraft structure subassembly ply and a wing skin ply. The resulting interleaved assembly is typically impregnated with resin and may be co-cured to achieve securement between the wing skin structure and support substructure without the need for discrete metallic fasteners. By avoiding metal fasteners such as rivets, the previously discussed problems of high shear stress and leakage can be eliminated.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in conjunction with the accompanying drawings, in which:

FIG. 3 is a perspective view illustrating a connection in accordance with the present invention wherein further assembly is illustrated.

DETAILED DESCRIPTION OF THE INVENTION

Figure 1:
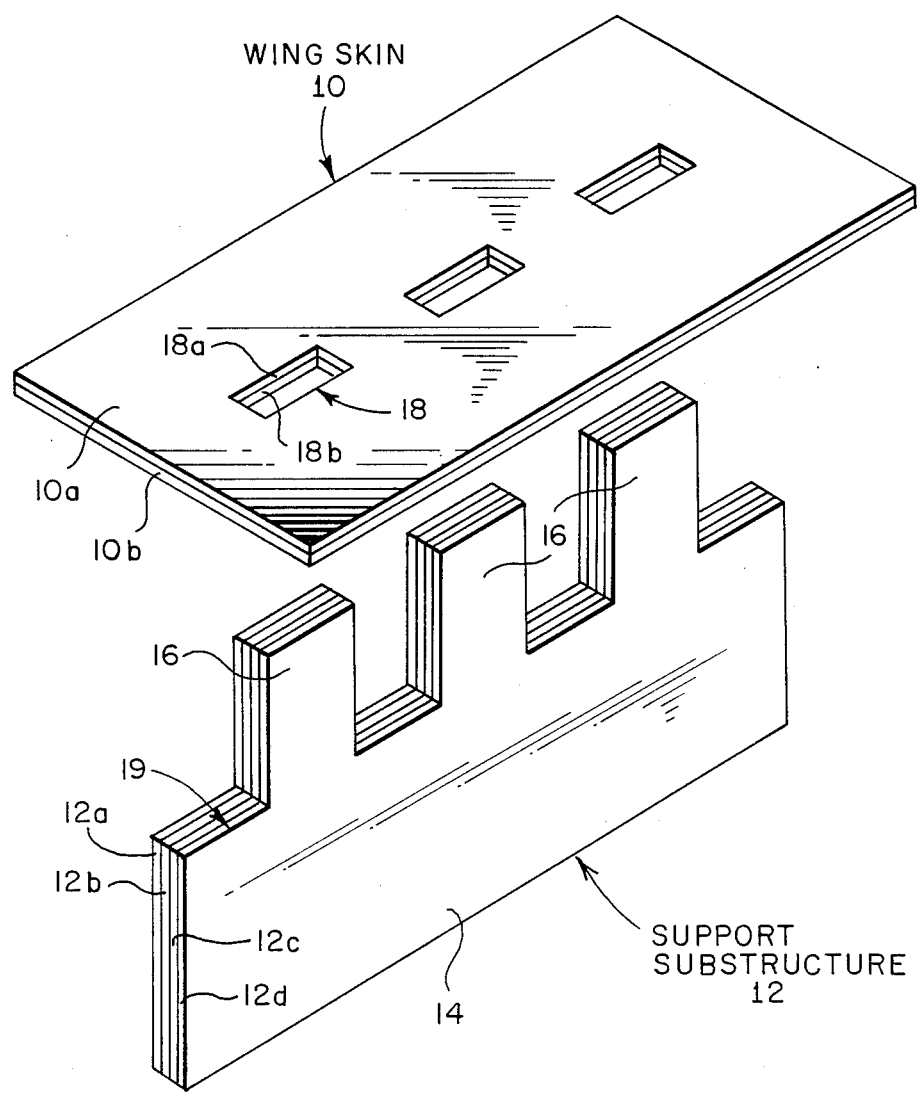
FIG. 1 is a perspective view indicating an initially formed support substructure and aircraft wing skin.

FIG. 1 illustrates an elementary form of the invention wherein an illustrative wing skin 10 includes two plies. A support substructure 12 is seen to include four plies. However, it is anticipated that both wing skin 10 and substructure 12 will be comprised of additional plies fabricated from resin-impregnated composite fabrics, as is well known in the aircraft industry. Wing skin 10 is seen to include individual plies 10a and 10b. In order to support the wing skin 10, the internally located substructure 12 is used and is indicated as comprised of the four plies 12a-12d. Overlapping finger-like extensions or tabs 16 extend from each ply of the main body portion 14 of substructure 12. Aligned rectangular slots 18 are formed in each ply in the wing skin 10 to enable passage of corresponding tabs 16 therethrough, as will be explained in greater detail in accordance with FIG. 2.

Figure 2:
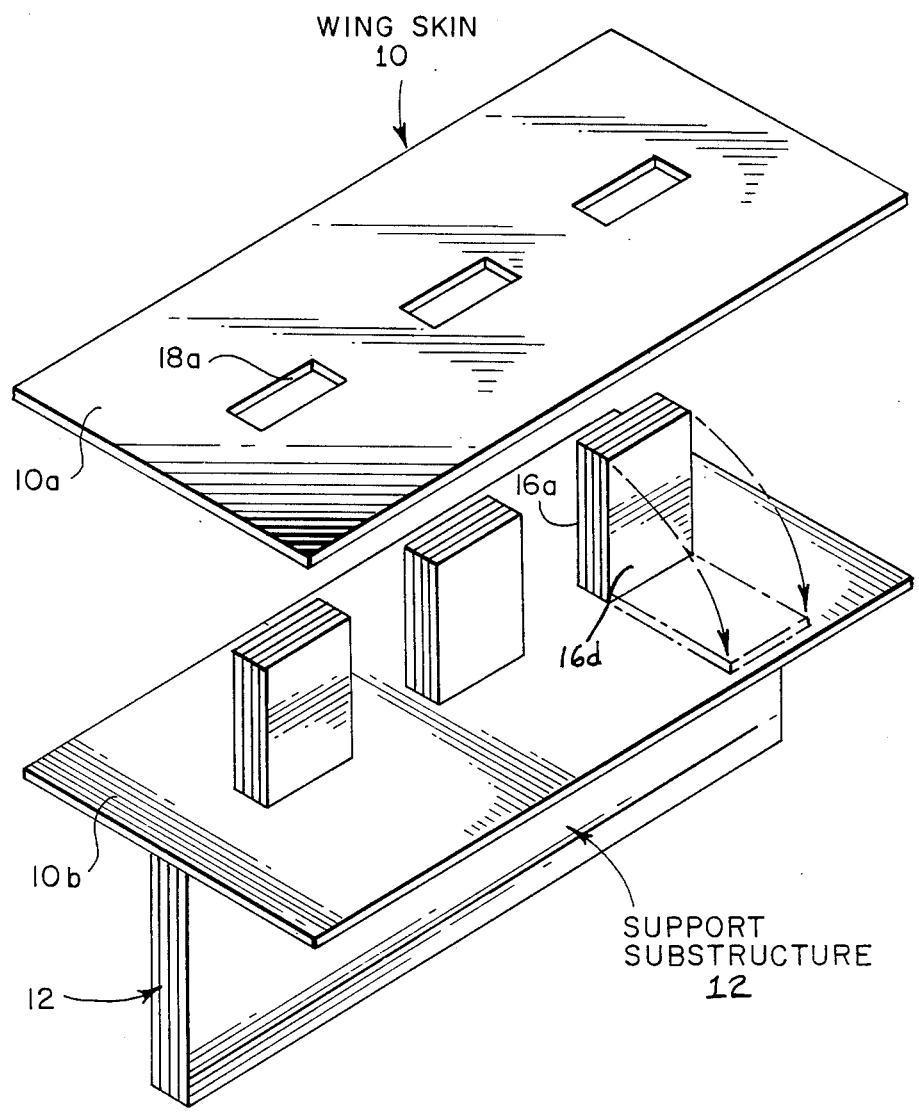
FIG. 2 is a perspective view illustrating a partially assembled connection between the support substructure and wing skin; p

As illustrated in FIG. 2, the wing skin is attached to the support structure by moving the first ply 10b into contact with the shoulder 19 (FIG. 1) of the substructure 12. All of the tabs 16 pass through correspondingly aligned rectangular openings 18a formed in respective ply 10a. The outermost tab plies 16a and 16d are bent downwardly, as indicated in phantom lines for 16d thereby locking the wing skin ply 10b against shoulder 19 of the support substructure 12. It is to be understood that the outermost plies 16a and 16d in each of the three illustrated separated groups of tabs 16 are turned down. The result is shown in FIG. 3 wherein tab plies 16a and 16d are illustrated in the folded-down position, thereby retaining the two innermost plies of each tab group in a continued upstanding position. In order to fill the gap in the lateral areas adjacent each of the folded-down tabs, individual spacer strips 20 may be positioned on the support substructure ply 10b. Although this additional step of inserting the spacer strips may not necessarily be necessary with thin skins, it would be most desirable in thicker skins having a greater number of plies, or in any other environment where uniform thickness of the wing skin is highly desirable.

With continued reference to FIG. 3, the remaining plies 16b and 16c of the three tab groups remain upstanding so that the remaining ply 10a may be deposited in overlying relationship with the folded-down tab plies 16a and 16d (and the spacer strips 20) thereby sandwiching the folded-down tab plies 16a and 16d (and spacer strips 20) between the wing skin plies 10a and 10b. After this occurs the remaining tab plies 16b and 16c are turned down so that they lie against the upper surface of wing skin ply 10a resulting in the interleaving of the wing skin piles and support substructure plies. This process would be repeated if additional plies of the wing skin and support substructure 12 were employed. A final ply 22 is deposited over the other wing skin plies, the final ply 22 having no openings and thereby sealing the other plies that have openings. Additional design considerations for the invention are desirable. For example, the rectangular openings in the wing skin ply should be consecutively tapered because the dimensions of the innermost rectangular opening 18b in outer ply 10b (FIG. 1) must be sufficiently wide to accommodate the thickness of all of the tabs while the rectangular opening 18a in the outermost ply 10a (FIG. 1) need only accommodate the remaining two plies 16a and 16c to be folded down. Obviously, if the support substructure 12 includes a great many plies, the variation in the width of consecutively overlying rectangular openings will be substantial and continuously tapering outwardly toward the interface between wing skin and substructure.

Further, although the tabs have been illustrated as being of the same length, this is purely to simplify the previous explanation of the invention. In reality it is desirable that the length of each ply be staggered somewhat from an overlying and underlying tab so that a smooth dimensional transition occurs where overlying and underlying wing skin plies are sandwiched against an intermediately positioned tab. Otherwise stated, if all of the tabs were, in actuality, the same length, a "bulge" or step change in thickness would occur at the point where the overlying outer edges of all the tabs are. Such a condition would encourage delamination as the fabricated wing skin encountered shear stress. In fact, it is important to emphasize that, by sandwiching only pairs of tabs between overlying and underlying wing skin plies, reinforced bonding between the wing skin and support substructure occurs along parallel planes which further decreases the possibility of delamination.

According to the previous description of the invention, by pushing the tabs 16 through corresponding rectangular slots 18 and bending the tabs against a corresponding wing skin ply, a geometrical mechanical lock between the substructure 12 and wing skin 10 occurs. This geometrical lock is secured when the resin-impregnated tabs 16 and resin-impregnated skin 10 are co-cured thereby resulting in a strong finished assembly.

Now that the construction of the present invention has been explained, it is important to point out that the support substructure 12 will normally be located in the interior of a completed wing assembly, while the wing skin 10 serves as the exterior of the wing.

It should be understood that the invention is not limited to the exact details of construction shown and described herein for obvious modifications will occur to persons skilled in the art.

I claim:

1. A joint connecting first and second structural members comprising:
    a first structural member having multiple plies each having at least a tab extending from a shoulder portion, the tab being juxtaposed on corresponding tabs of other plies;
    a second structural member having multiple plies and an opening formed therein for receiving the tabs and enabling the second structural member to abut the shoulder portion of the first structural member;
    wherein pairs of tabs are folded against respective plies of the second structural member to interleave the first and second structural members into connecting relationship.

2. A joint connecting first and second structural members comprising:
    a first structural member having multiple plies each having at least a tab extending from a shoulder portion, the tab being juxtaposed on corresponding tabs of other plies;
    a second structural member having at least one ply and an opening formed therein for receiving the tabs and enabling the second structural member ply to abut the shoulder portion;
    wherein pairs of tabs are folded against respective plies of the second structural member to interleave the first and second structural members into connecting relationship; and
    wherein the tabs are staggered in length so that outer edges thereof do not overlie one another thereby minimizing thickness variations of a finished structure.

3. The structure set forth in claim 2 and further wherein the second structural member is comprised of stacked multiple plies, each of which has an opening smaller than the opening in an underlying ply thereby creating a tapered resultant opening in the stacked multiple plies; and
    spacer strips positioned between tabs folded against a particular ply thereby equalizing the thickness of the second structural member.

4. A joint connecting first and second structural members comprising:
    a first structural member having multiple plies each having at least a tab extending from a shoulder portion, the tab being juxtaposed on corresponding tabs of other plies;
    a second structural member having at least one ply and an opening formed therein for receiving the tabs and enabling the second structural member ply to but the shoulder portion;
    wherein pairs of tabs are folded against respective plies of the second structural member to interleave the first and second structural members into connecting relationship; and
    wherein the second structural member is comprised of stacked multiple plies, each of which has an opening smaller than the opening in an underlying ply thereby creating a tapered resultant opening in the stacked multiple plies.

5. A joint connecting first and second structural members comprising;
    a first structural member having multiple plies each having at least a tab extending from a shoulder portion, the tab being juxtaposed on corresponding tabs of other plies;
    a second structural member having at least one ply and an opening formed therein for receiving the tabs and enabling the second structural member ply to abut the shoulder portion;
    wherein pairs of tabs are folded against respective plies of the second structural member to interleave the first and second structural members into connecting relationship;
    together with spacer strips positioned between tabs folded against a particular ply thereby equalizing the thickness of the second structural member.

6. In an aircraft including a skin structure and internal support substructure, a connector joint interleaved therebetween and comprising:
    a support substructure having multiple plies each having at least a tab extending from a shoulder portion, the tab being juxtaposed on corresponding tabs of other plies;
    a skin structure having at least one ply and an opening formed therein for receiving the tabs and enabling the skin structure ply to abut the shoulder portion;
    wherein pairs of tabs are folded against respective plies of the skin structure to interleave the support substructure and the skin structure into connecting relationship;
    wherein the tabs are staggered in length so that outer edges thereof do not overlie one another thereby minimizing thickness variations of a finished structure.

the skin structure being comprised of stacked multiple plies, each of which has an opening smaller than the opening in an underlying ply thereby creating a tapered resultant opening in the stacked multiple plies; and spacer strips positioned between tabs folded against a particular ply thereby equalizing the thickness of the skin structure.

7. The structure set forth in claim 6 together with a plain ply overlying the outermost ply of the skin structure for sealing the openings.

8. A method for connecting an aircraft skin structure to an internal support substructure comprising the steps:

forming an internal support substructure for the skin structure, multiple plies having a series of overlapping tabs extending outwardly from a shoulder portion;

forming a wing skin structure from multiple stacked plies having aligned openings therein in registry with the tabs;

passing the tabs through the skin structure, one ply at a time, resulting in a skin structure abutting the shoulder portion of the support substructure;

folding down a pair of outwardly located tabs against the surface of a corresponding skin structure ply whereby each tab pair is interleavingly sandwiched between overlying and underlying skin structure plies; and depositing a plain ply over the outermost ply of the resulting skin structure to seal the openings.

9. The method set forth in claim 8 wherein the tabs are formed in staggered length so that outer edges thereof do not overlie one another thereby minimizing thickness variations of a finished structure; and further wherein each individual opening in a particular ply is formed smaller than the opening in an underlying ply thereby creating a tapered resultant opening in the stacked multiple plies.

10. The method set forth in claim 9 together with the step of depositing spacer strips between tabs folded against a particular ply thereby equalizing the thickness of the second structural member.

* * * * *

UNITED STATES PATENT AND TRADEMARK OFFICE
CERTIFICATE OF CORRECTION

PATENT NO. : 4,875,795

DATED : October 24, 1989

INVENTOR(S) : Robert E. Anderson

It is certified that error appears in the above-identified patent and that said Letters Patent is hereby corrected as shown below:

Column 1, line 61, after "skin'", delete "p".

Column 2, line 51, change "piles" to --plies--;

line 60, after "of" (second occurrence)

delete ";".

Column 4, line 23, change "but" to --abut--.

Signed and Sealed this

Thirtieth Day of October, 1990

Attest:

HARRY F. MANBECK, JR.

*Attesting Officer*      *Commissioner of Patents and Trademarks*